US011828617B2

(12) United States Patent
Asmari et al.

(10) Patent No.: US 11,828,617 B2
(45) Date of Patent: Nov. 28, 2023

(54) SYSTEM AND METHOD FOR ASSET IDENTIFICATION AND MAPPING

(71) Applicant: ULC TECHNOLOGIES, LLC, Hauppauge, NY (US)

(72) Inventors: Ali Asmari, Selden, NY (US); G. Gregory Penza, III, Old Field, NY (US)

(73) Assignee: ULC TECHNOLOGIES, LLC, Hauppauge, NY (US)

( * ) Notice: Subject to any disclaimer, the term of this patent is extended or adjusted under 35 U.S.C. 154(b) by 215 days.

(21) Appl. No.: 16/931,094

(22) Filed: Jul. 16, 2020

(65) Prior Publication Data

US 2021/0020073 A1  Jan. 21, 2021

Related U.S. Application Data

(60) Provisional application No. 62/874,761, filed on Jul. 16, 2019.

(51) Int. Cl.
G01C 21/00 (2006.01)
G09B 29/00 (2006.01)
G01S 19/47 (2010.01)
G06V 20/56 (2022.01)
G06F 18/2413 (2023.01)

(52) U.S. Cl.
CPC .......... G01C 21/3804 (2020.08); G01S 19/47 (2013.01); G06F 18/2413 (2023.01); G06V 20/56 (2022.01); G09B 29/007 (2013.01)

(58) Field of Classification Search
CPC ........ G06K 9/627; G01S 19/47; G06V 20/56; G09B 29/007; G06F 18/2413; G01C 21/3804
USPC ......................................................... 702/150
See application file for complete search history.

(56) References Cited

U.S. PATENT DOCUMENTS

| 7,623,248 | B2 * | 11/2009 | Laflamme | G01C 11/02 |
| | | | | 382/104 |
| 10,339,496 | B2 * | 7/2019 | Matson | G06F 3/04842 |
| 10,380,423 | B2 * | 8/2019 | Pittman | G06V 20/176 |
| 2002/0106109 | A1 * | 8/2002 | Retterath | G01N 21/251 |
| | | | | 382/104 |
| 2020/0111222 | A1 | 4/2020 | Asmari et al. | |

FOREIGN PATENT DOCUMENTS

| WO | 2017172778 A1 | 10/2017 |
| WO | 2018071416 A1 | 4/2018 |
| WO | 2019060745 A1 | 3/2019 |

OTHER PUBLICATIONS

App. No. GB1914524.2—Search Report dated Jul. 17, 2020.
(Continued)

Primary Examiner — Aditya S Bhat
(74) Attorney, Agent, or Firm — Husch Blackwell LLP

(57) ABSTRACT

A system for asset identification and mapping is configured to information related to a plurality of objects with at least one sensor. The captured information may be processed to identify one or more assets among the objects, and a map generated including a geographic area proximate to at least one of the one or more assets. The at least one of the one or more assets may then be identified on the map.

5 Claims, 3 Drawing Sheets

(56) References Cited

OTHER PUBLICATIONS

Paz et al., Large-Scale 6-DOF SLAM With Stereo-in-Hand, IEEE Transactions on Robotics, pp. 946-957, vol. 24, No. 5, Oct. 2008.
Shen et al., Vision-Based State Estimation for Autonomous Rotorcraft MAVs in Complex Environments, pp. 1758-1764, IEEE International Conference on Robotics and Automation (ICRA), May 2013.
Hochdorfer et al., 6 DoF SLAM using a ToF Camera: The Challenge of a continuously growing number of landmarks, pp. 3981-3986, Intelligent Robots and Systems (IROS), 2010.
Prusak et al., Abstract of Post Estimation and Map Building with a Time-of-Flight-Camera for Robot Navigation, International Journal of Intelligent Systems Technologies and Applications, Nov. 2018.
Yatim et al., Automated Mapping for Underground Pipelines: An Overview, 2nd International Conference on Electrical, Electronics and System Engineering (ICEESE), 2014.

\* cited by examiner

SYSTEM AND METHOD FOR ASSET IDENTIFICATION AND MAPPING

CROSS-REFERENCE TO RELATED APPLICATIONS

This application claims the benefit of U.S. provisional application Ser. No. 62/874,761 filed Jul. 16, 2019, the disclosure of which is hereby incorporated in its entirety by reference herein.

TECHNICAL FIELD

The present disclosure relates to a system and method for asset identification and mapping.

BACKGROUND

Identifying and locating objects of interest may be—depending on the objects, their location, and how many of them there are—a time-consuming and labor-intensive process. For example, utility companies manage millions of electrical poles, which may be outfitted with different kinds of electrical equipment, such as switches, transformers, etc. Because these electrical poles are installed at different times over the course of many years, and because they may be located over thousands of miles, accurate information regarding their location and the electrical equipment they carry may be difficult to obtain or even non-existent. Over time, the electrical equipment and even the poles themselves may require repair or replacement. It is therefore important to have accurate information available regarding the location and types of equipment these electrical poles carry.

Manual data collection and analysis requires highly trained engineers to review hundreds or even thousands of photographs, identify the assets in the photographs, and correlate them with map data. This requires an enormous investment in time and human resources. In addition, the accuracy of the maps and associated reports can vary widely depending on the individuals collecting and analyzing the data. Thus, a need exists for an automated or semi-automated process for capturing information related to targeted objects, such as electrical poles and the equipment they carry, and locating the objects on a geographical map so they can be appropriately managed.

SUMMARY

Embodiments described herein may include a system for asset identification and mapping that includes capturing information related to a plurality of objects with at least one sensor. The captured information may be processed to identify one or more assets among the objects, and a map generated including a geographic area proximate to at least one of the one or more assets. The at least one of the one or more assets may then be identified on the map.

The at least one sensor described above may include, for example, one or more still-image cameras, video cameras, thermal sensors, global positioning systems (GPS), etc. At least some embodiments may include one or more cameras, other sensors, or both mounted on a vehicle for use in real-time image or other data capture of assets and features located along roadways—i.e., electrical poles, transformers, switches, manhole covers, storm drains, valve boxes, wires, cell towers, etc. In at least some embodiments, a camera having a wide field-of-view may be mounted to an automotive vehicle to capture image data as the vehicle travels along the roadway at normal, posted speeds—i.e., the vehicle does not need to travel at extra low speeds just to collect the data. The data or image feed may be analyzed real time and may be stored locally. It can then be used to classify and locate assets through the use of machine learning. Stored data and image information can be uploaded to a server or to the cloud for analysis.

The vehicle may be equipped with a GPS, an inertial measurement unit (IMU) system, or both that records the location of the vehicle—e.g., one or more of the latitude, longitude, and altitude—and its speed and acceleration in every direction. The GPS information may be used to geotag the location of the detected assets and then store the data for integration with a mapping application. A computer processing unit on board of the vehicle may analyze the data and image information in real time, identify the assets, and generate a graphic information system (GIS) map of the assets using the information collected from the GPS and the IMU. This processing may occur on a server or a cloud-based system using stored sensor and image data.

As the vehicle drives along the road, video images, still images, sensor data, or some combination of these, may be collected. A navigation application may be used to guide the driver and to identify and optimize the route to collect data points that have not been collected during past data-collection trips. The navigation application may have a connection to a server that identifies routes to travel or locations where data collection is needed. A computer on board the vehicle may process the image and other data in real time or near real time to identify target assets on the route; alternatively, the data may be stored on a local hard drive, uploaded to cloud storage or to a dedicated computer server for later processing.

A machine-learning algorithm detects target assets—e.g., utility poles, transformers, etc.—in the video feed collected by the vehicle-mounted cameras and other sensors. With appropriate camera calibration and using image-processing algorithms, the software may calculate the distance of each target asset from the vehicle. Then, using the calculated distance of the assets to the vehicle, and based on the GPS location of the vehicle when each frame of the video was taken, the exact location—e.g., latitude, longitude, and altitude of each detected asset is calculated and marked on a GIS map. The location information and pictures of each detected asset may be integrated into a mapping system, such as an ArcGIS mapping system, for review and assessment.

Embodiments described herein may also include a machine learning algorithm that can be trained on the acquired data to detect different defects on a variety of assets, such as visible cracks on an electrical pole or anomalies at the connection points of transmission lines or distribution lines. Using image-processing techniques, the asset information and pole number can be automatically identified and reported. Data collected during one trip—which may act as a baseline or historical reference—may be compared to data from subsequent trips to identify changes in construction, orientation, and condition of assets. Repeat trips and analysis may be performed at some frequency to create a dynamic and up-to-date map of the assets. This type of information may also be useful to identify storm damage or in planning future work.

Images of vegetation such as trees may be captured, and specific species identified. Data collected may include 3D geospatial data—e.g., simultaneous localization and mapping (SLAM), stereovision, LiDAR, etc.—and data related to vegetation health, which may be determined using sensors capable of multispectral imaging. The data may also provide information regarding the size, location, growth pattern, and condition of vegetation along the route. Using species-specific information, such as historical growth rates, seasonal conditions, maximum species size, etc., along with other sensor data collected, predictive growth rates and maintenance requirements can be generated and plans for vegetation management can be more intelligently designed. In addition, software developed to identify and map assets may be configured to be hardware agnostic so that it is not limited to use on automotive vehicles, but can also be used with unmanned aerial vehicles (UAVs), off-road vehicles, helicopters, handheld data-and-video-capture systems, and other methods of sensor system transport.

At least some embodiments described herein may include a system for asset identification and mapping that includes a vehicle having at least one sensor operable to sense information related to a plurality of objects positioned proximate to the vehicle. At least one of the objects may have a predefined classification. The system may also include a control system having at least one processor and programmed with identification information related to the at least one predefined classification, the control system being configured to perform the following: receive sensed information from the at least one sensor and compare the sensed information with the programmed identification information, label at least one of the at least one objects based on a comparison of the sensed information with the programmed identification information to at least partially define a targeted object, apply identifying information to the targeted object, and map a location of the targeted object to generate a targeted object map.

At least some embodiments described herein may include a system for asset identification and mapping that includes a vehicle having at least one camera operable to capture image information related to a plurality of objects positioned proximate to the vehicle. The system may also include a control system having at least one processor and programmed with identification information related to at least one first identifier. The control system may be configured to receive captured image information from the at least one camera and compare the captured image information with the programmed identification information. The control system may further be configured to classify at least one of the objects based on a comparison of the captured image information with the programmed identification information to at least partially define a targeted object, and map a location of the targeted object to generate a targeted object map.

At least some embodiments described herein may include a method for asset identification and mapping that includes sensing information related to a plurality of objects positioned proximate to a vehicle. At least one of the objects may have a predefined classification. The method may also include programming a control system having at least one processor with identification information related to the at least one predefined classification, and using the control system to compare the sensed information with the identification information. The control system may also be used to label at least one of the at least one objects based on a comparison of the sensed information with the identification information to at least partially define a targeted object, and map a location of the targeted object to generate a targeted object map.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
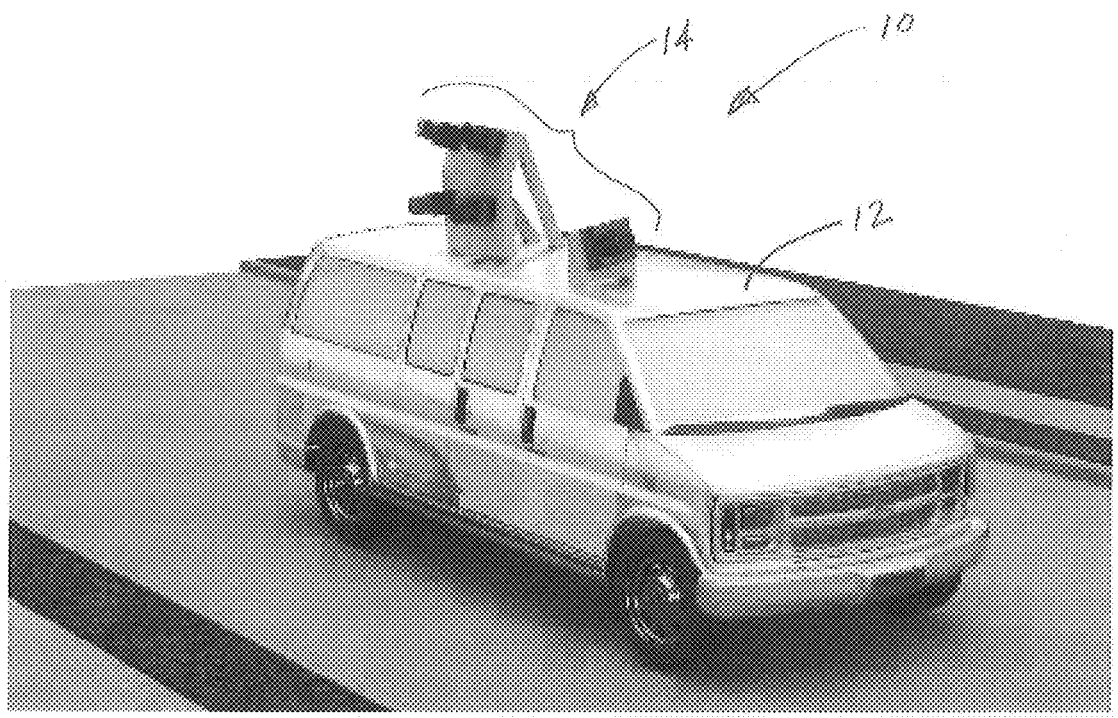
FIG. 1 shows an automotive vehicle equipped with imaging equipment in accordance with embodiments described herein.

FIG. 1 shows a portion of an asset identification and mapping system 10 in accordance with embodiments described herein. Shown in FIG. 1 is an automotive vehicle 12 equipped with an array of video cameras 14 configured to capture images of desired assets while the vehicle is traveling along a road. In at least some embodiments, assets may include objects related to utility infrastructure, such as electrical poles and the equipment they carry—e.g., transformers, switches, fuses, etc. As described above, images captured from the camera array 14 may be stored locally on a computer or uploaded to a dedicated server or a cloud-computing storage location. The camera array 14 represents just one kind of sensor that can be used with embodiments of a system described herein. For example, non-visual sensors, such as thermal sensors, may be used instead of or in conjunction with cameras. In general, embodiments may include at least one sensor operable to sense information related to a plurality of objects positioned proximate to the vehicle. In the embodiment shown in FIG. 1, the sensors are the array of cameras 14, which are operable to capture image information related to objects outside the vehicle 12.

Figure 2:
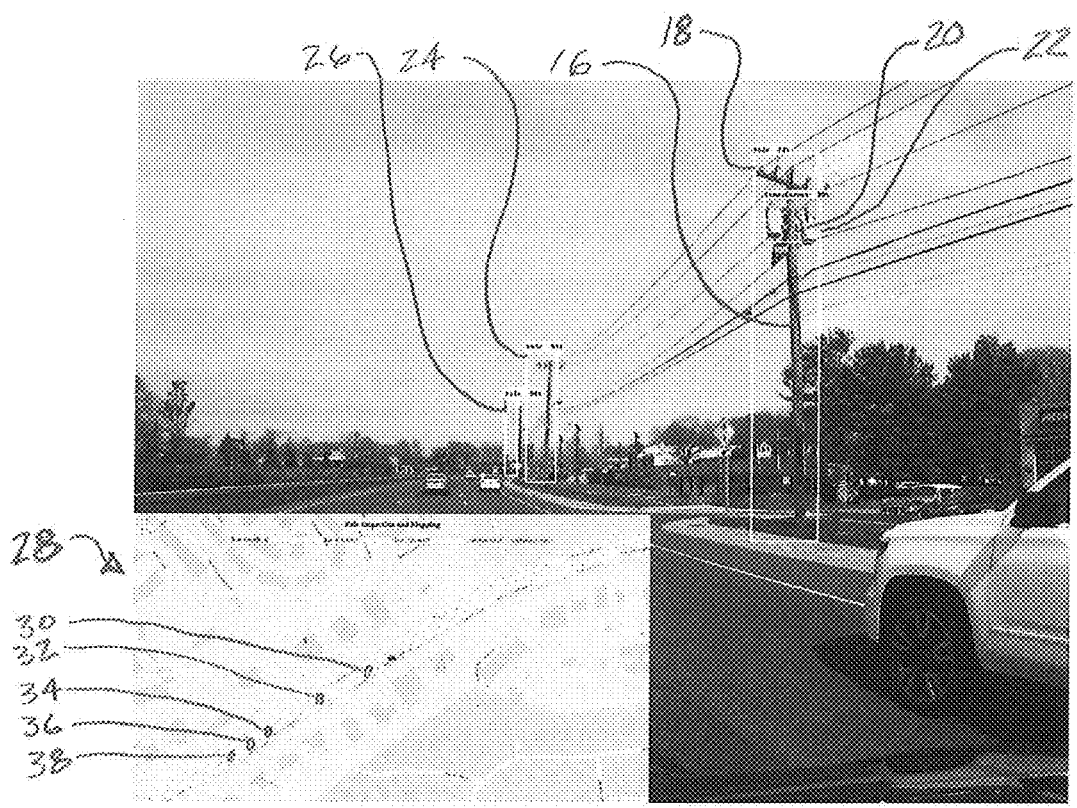
FIG. 2 shows a captured image with electrical-infrastructure assets identified and located on an inset map in accordance with embodiments described herein.

In order to identify desired assets, object-recognition software is trained using images of known assets and identifying them to the software system. In some embodiments, hundreds or thousands of images may be used to initially train the system 10, which will improve its identification capabilities over time with machine-learning algorithms built into the software. FIG. 2 shows real-time processing of asset identification using the camera array 14 and analysis software described above. For example, a utility pole 16 is identified by a rectangular box 18, which is automatically drawn by the software around the pole 16. In the embodiment shown in FIG. 2, an electrical transformer has also been previously identified as a targeted asset and programmed into the software, so that a transformer 20 is also identified with a separate rectangular box 22 automatically drawn around it. The software used in the embodiment shown in FIG. 2 is also programmed to identify the asset by name—in this example "Pole" and "Transformer"—and to provide a value related to the accuracy of its identification, in this case measured in percent. Because the camera array 14 includes wide-angle and long-distance lenses, utility poles 24, 26 positioned some distance away from the vehicle 12 are also identified. In this way, the vehicle 12 can operate at posted road speeds and still obtain and process asset information accurately.

In order to process information received from the sensor or sensors—e.g., the camera array 14—the system 10 also includes a control system having at least one processor. One such control system 27 is illustrated and described in more detail in conjunction with FIG. 5. The control system 27 may be programmed with identification information related to at least one predefined classification. For example, as described above, many images may be used to initially train the system, and these images may be identified through one or more classifications, such as a utility pole or a transformer as described above. Thus, the vehicle 12 includes sensors in the form of digital cameras 14 that provide sensed information in the form of captured image information to the control system 27 that compares this information with the programmed identification information to initially label the objects 16, 20 as a utility pole and a transformer respectively. The utility pole 16 and the transformer 20 may be generally considered a "targeted object"—that is, the assets the system 10 is programmed to identify. As described in more detail below, the control system 27 may also be programmed to apply additional identifying information to the targeted objects 16, 20—for example, a serial number or other identifying indicia.

Figure 3:
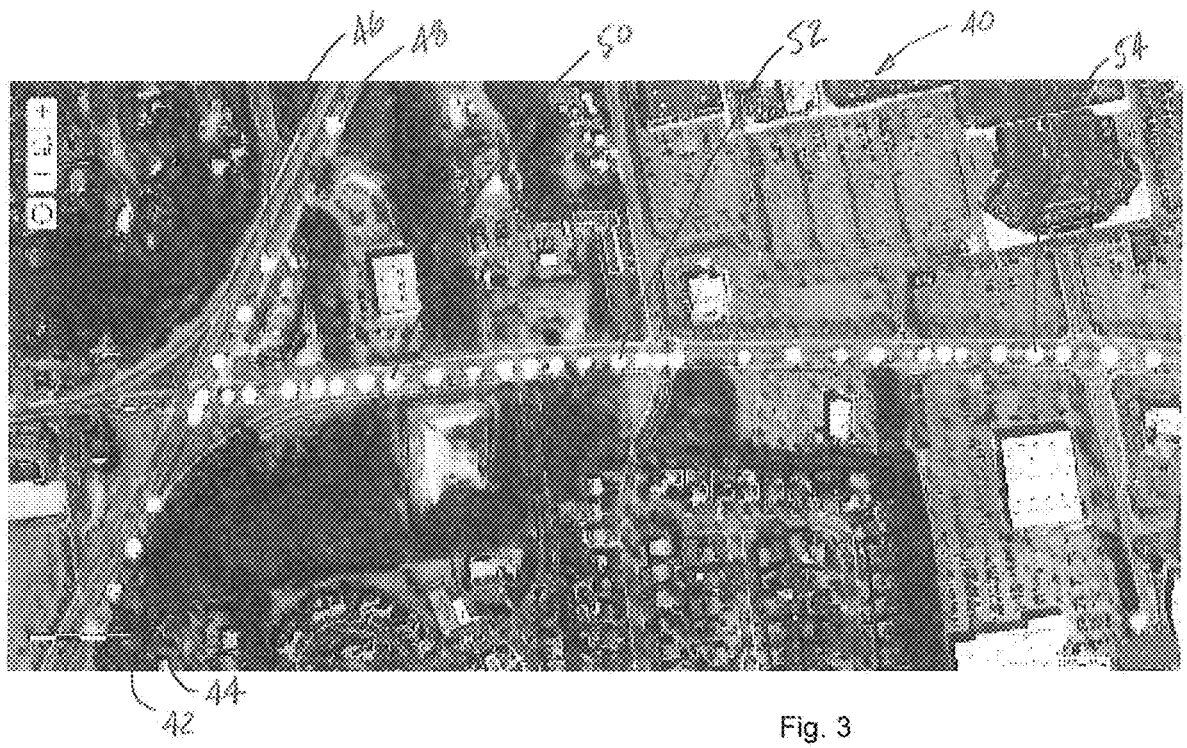
FIG. 3 shows assets identified on an ArcGIS satellite map.
Figure 4:
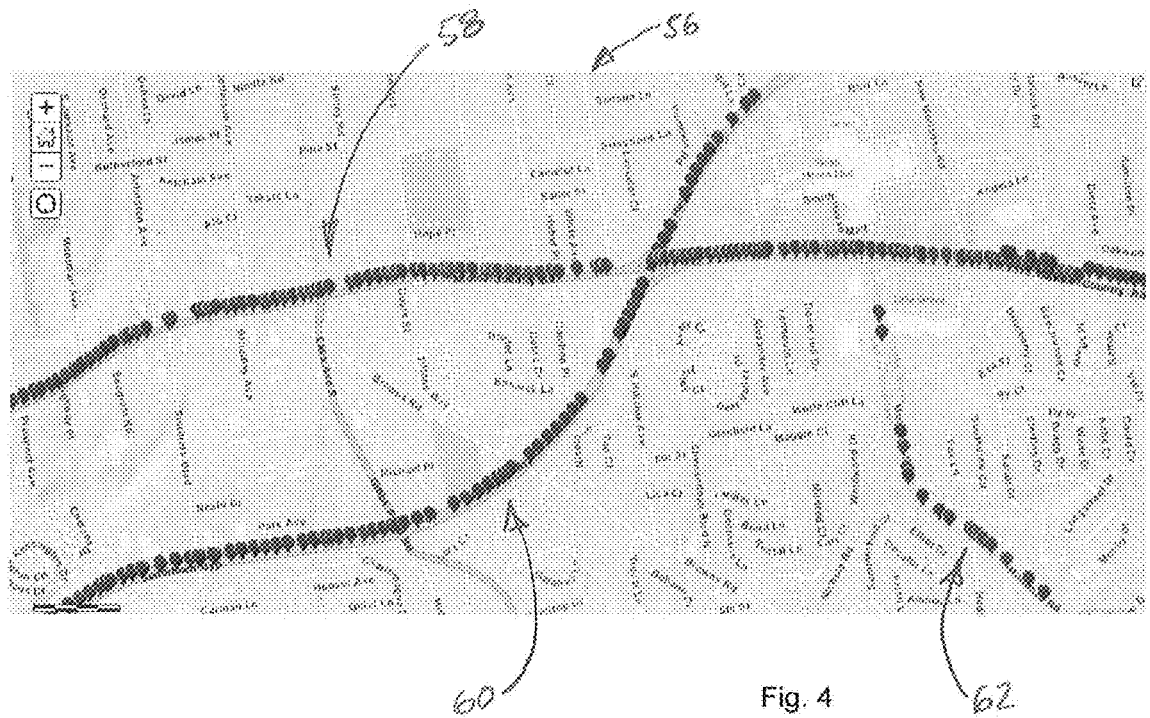
FIG. 4 shows assets identified on an ArcGIS street map.

Also shown in FIG. 2 is a map 28—e.g., a GPS map—showing initial locations of assets 30, 32, 34, 36, 38 identified by the camera array 14 and the associated processing software, some or all of which may be contained within the control system 27. Once a group of assets has been identified and labeled in the software system, the information can be input into a GIS map program so the assets can be identified on an accurate geographical map. This is illustrated in FIG. 3, which shows a GIS satellite map 40 with several dozen assets accurately positioned along the road where they are located. In FIG. 3, the assets are indicated by white circles, but only a select few are labeled for clarity—see labeled assets 42, 44, 46, 48, 50, 52, 54. FIG. 4 also shows an ArcGIS map 56, but one that shows a much larger area than the map in FIG. 3. The map 56 is also configured as a street map, rather than a satellite rendition as shown in FIG. 3. Because the map 56 shows a much larger area, the density of assets—labeled generally at 58, 60, 62—is much greater than in FIG. 3. Using a mapping system, such as ArcGIS, in accordance with embodiments described herein, a utility operator or other interested party can obtain a high-level view of the location of assets over a large area such as shown in FIG. 4, or may zoom in on a particular area so that assets are separated from each other and their locations precisely identified, such as shown in FIG. 3.

Figure 5:
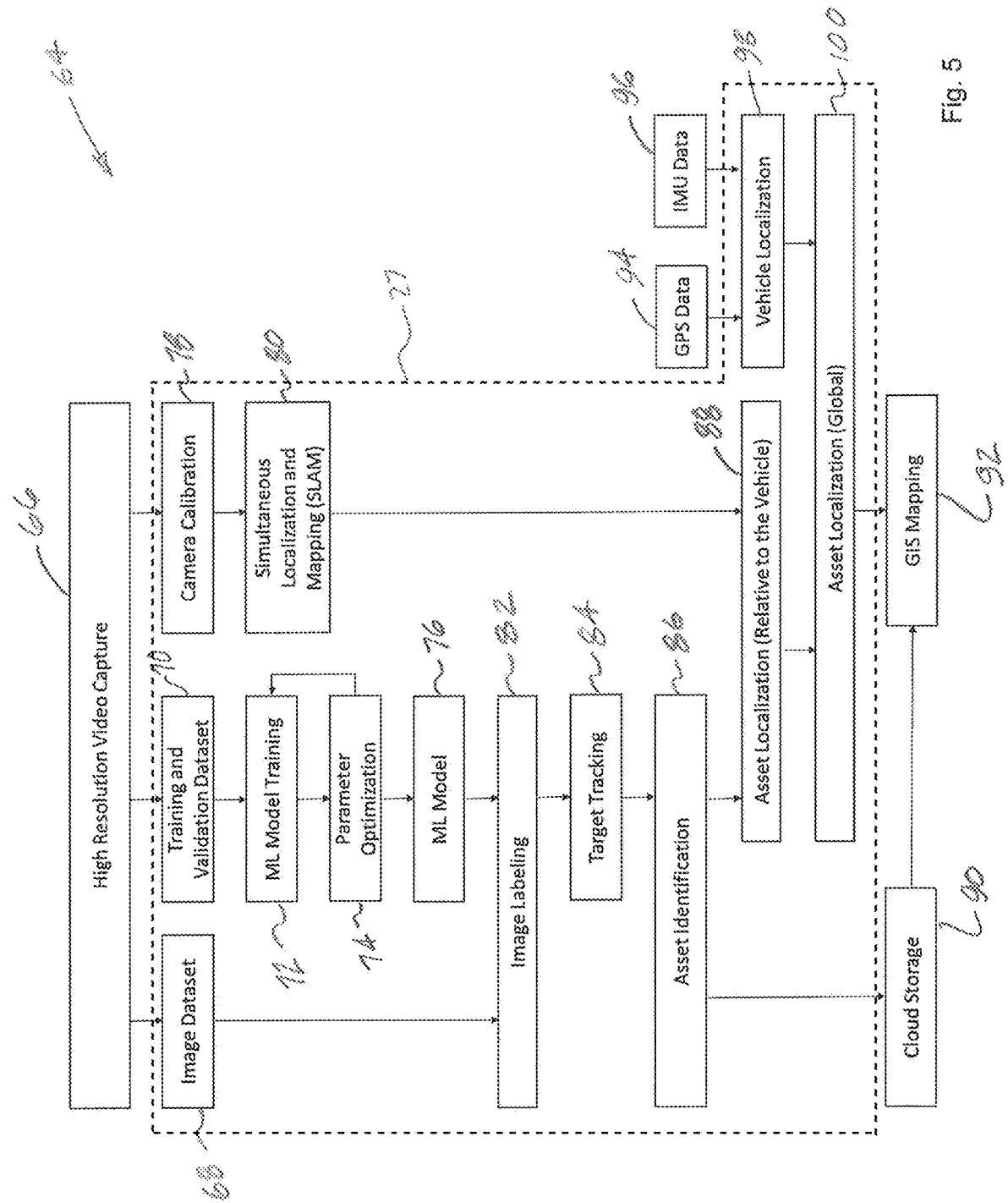
FIG. 5 shows a flowchart illustrating a method in accordance with embodiments described herein.

FIG. 5 shows a flowchart 64 illustrating a method of asset identification and mapping in accordance with embodiments described herein. The method may be performed by elements of the system 10 described above working together, and in particular, the control system 27 processing the information received from at least one sensor, such as the camera array 14. The method begins at step 66 with a high-resolution video capture, such as described above with reference to the automotive vehicle 12 and camera array 14 shown in FIG. 1. In this embodiment, the camera array 14 acts as a group of sensors operable to sense information related to objects outside the vehicle 12, such as the utility pole 16 and transformer 20. In this embodiment, the sensed information is image information captured by the camera array 14. Although in some embodiments, a camera or cameras, such as the camera array 14, may be configured to capture still images, in this embodiment, the camera array 14 is equipped with digital video cameras configured to capture a continuous set of images as the vehicle 12 traverses the desired route.

Information from the video capture at step 66 is provided to the control system 27 to generate an image data set 68. In order for the software in the control system 27 to process the image data set 68, a training and validation data set 70 is preprogrammed into the control system 27. This was described above in conjunction with the images used to initially train the system 10. The identification information programmed into the control system 27 is related to the classification or classifications described above. Thus, several thousand images of utility poles or transformers, or both, are programmed into the control system 27 so that it can perform the step of comparing the sensed information—e.g., the captured image information—to the programmed identification information to at least partially define a targeted object such as the utility pole 16 or the transformer 20. So, for example, the camera array 14 may detect a vertical member positioned proximate to the vehicle 12, and may further detect a shorter cylindrical object attached to the vertical member. When the images of these elements are processed by the control system 27, a comparison of the captured image data to the previously programmed identification information allows the control system 27 to identify the vertical object as a utility pole and the shorter cylindrical object as a transformer. Depending on the application, this may be all the identification that is desired—i.e., the targeted objects are classified as part of a group, but are not uniquely identified within that group.

Using the training and validation data set from step 70, machine-learning-model training and parameter optimization take place at steps 72 and 74, respectively. As shown in FIG. 5, these two steps are iterated until an acceptable machine-learning model is generated at step 76. Thus, the control system 27 is further configured to modify the programmed identification information based on information related to the targeted object—i.e., the training and validation data set 70 is improved through machine learning by using the new information captured by the camera array 14 or other sensors.

Also part of the processing, a camera calibration takes place at step 78 and SLAM occurs at step 80, thereby providing information regarding the targeted objects relative to the position of the vehicle 12 on which the camera array 14 is mounted. Although SLAM is used in the embodiment illustrated and described herein, in other embodiments, different localization algorithms may be used. Although the generation of the image data set is shown in the flowchart 64 as occurring in parallel with the training and validation data set processing at step 70 and the camera calibration at step 78, it is important to note that the flowchart 64 shows only one way in which these steps may be performed; in other embodiments these steps may be performed in a different order, such as in series, or in some other chronological order.

Using the machine-learning model from step 76 with the image data set from step 68, the image labeling occurs at step 82. In this step the control system 27 labels the objects based on a comparison of the sensed information with the programmed identification information to at least partially define the targeted objects. For example, in the image labeling step 82, the control system 27 identifies the vertical member as a utility pole and the shorter cylindrical object as a transformer. Thus, these two targeted objects are identified or classified as part of the group. In this embodiment, the more specific identifying information is applied at step 86.

Target tracking and asset identification take place at steps 84 and 86, respectively. In at least one embodiment, the target tracking at step 84 may be described as follows. During target tracking, the control system 27 identifies and follows an asset of interest in a video or other sensed data transferred to the control system 27 from the sensor or sensors, such as the camera array 14. With regard to a video, the information it provides may be analyzed as a series of individual, consecutive frames that are expected to be very close to one another—i.e., very little changes from one frame to the next in a high-speed video. The control system 27 is programmed to identify objects of interest—i.e., targeted objects—in multiple consecutive frames, and because the location of the targeted objects changes very little in each frame, it may be assumed that objects identified in a similar spot within an acceptable threshold of different locations may be considered the same object. Using this analytical process allows the control system to track a specific asset, such as the utility pole 16 or the transformer 20 through multiple frames of a video. This is how the target object is tracked at step 84.

The asset identification occurring at step 86 is where the control system 27 applies identifying information to the targeted object. As described above, the control system 27 identifies the vertical member as a utility pole and the shorter cylindrical object as a transformer at step 82. At step 86, additional identifying information may be applied by the control system 27, such as applying a serial number or other identifying indicia. This identifying information may be, for example, found on the object itself and captured by the camera array 14, or it may be retrieved by the control system 27 based on the known location of the targeted object. Therefore, at step 86, the utility pole 16 may be identified not just as a utility pole, but as a specific utility pole having a unique identifier such as a serial number; the same is true for the transformer 20.

From the asset identification, information may be passed such that asset localization relative to the vehicle may be combined with the SLAM data at step 88. Alternatively, the information from the asset identification at step 86 can be passed to a cloud storage at step 90, from which GIS mapping as described above occurs at step 92. If the asset localization step occurs at 86, GPS data 94 and IMU data 96 are also input into a vehicle localization algorithm at step 98. In this way, the control system 27 is configured to map a location of the targeted object to generate a targeted object map. The asset localization that occurs at step 88 defines a location of the targeted object—e.g., the utility pole 16, the transformer 20, or both—relative to a position of the vehicle 12. In order for the information generated by the system 10 to be even more useful, it may be desirable to map the targeted object or objects globally, rather than just relative to the vehicle 12. Therefore, in this embodiment, the vehicle localization information at step 98 and the asset localization information at step 88 are combined to generate a global asset localization at step 100, from which a GIS map may be generated as shown at step 92. Specifically, the GPS data, the IMU data, or both, may be used to identify a position of the vehicle 10 globally so that at step 100 the position of the targeted object can be defined globally. Thus, in some embodiments, the targeted object map may define a position of the targeted object relative to the vehicle; whereas, in other embodiments, the targeted object map may define a position of the targeted object globally.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for asset identification and mapping, comprising:
    sensing information related to objects positioned proximate to a vehicle, at least one of the objects having a predefined classification;
    calculating a distance from the objects to the vehicle using a camera calibration and localization process;
    processing the sensed information using a control system provided in the form of a processor programmed with identification information related to the predefined classification;
    comparing the sensed information with the identification information; and
    labeling the objects with a unique identifier based on a comparison of the sensed information with the identification information related to the predefined classification.

2. The method of claim 1, wherein sensing information related to the objects includes capturing image data related to at least one of the objects.

3. The method of claim 1, wherein the labeling includes the predefined classification, and the method further comprises using the control system to apply identifying information to the object.

4. The method of claim 1, further comprising:
    mapping a position of the object relative to the vehicle; and
    determining a position of the vehicle using a global positioning system (GPS), an inertial measurement unit (IMU), or a combination thereof.

5. The method of claim 1, wherein the unique identifier is provided in the form of a serial number associated with the object.

* * * * *